United States Patent [19]

Hartmann

[11] Patent Number: 5,073,355

[45] Date of Patent: Dec. 17, 1991

[54] PROCESS FOR THE REMOVAL OF CHLORINE FROM OFF-GASES

[75] Inventor: Achim Hartmann, Pulheim, Fed. Rep. of Germany

[73] Assignee: Kronos (U.S.A.), Inc., Hightstown, N.J.

[21] Appl. No.: 548,669

[22] Filed: Jul. 5, 1990

[30] Foreign Application Priority Data

Jul. 5, 1989 [EP] European Pat. Off. ........ 89112241.8

[51] Int. Cl.$^5$ .......................... C01B 7/01; C01G 23/02
[52] U.S. Cl. ...................................... 423/79; 423/241; 423/492
[58] Field of Search ............... 423/241, 613, 612, 492, 423/79

[56] References Cited

U.S. PATENT DOCUMENTS

| | | | |
|---|---|---|---|
| 3,647,383 | 3/1972 | Farmer et al. | 423/613 |
| 3,683,590 | 8/1972 | Dunn, Jr. | 423/240 R |
| 3,867,515 | 2/1975 | Bohl et al. | 423/613 |
| 3,929,501 | 12/1975 | Dunn, Jr. | 423/610 |
| 4,183,899 | 1/1980 | Bonsack | 423/149 |
| 4,355,015 | 10/1982 | Heckel et al. | 423/613 |
| 4,533,530 | 8/1985 | Hartmann | 423/240 |

FOREIGN PATENT DOCUMENTS

| | | | |
|---|---|---|---|
| 3328675 | 2/1985 | Fed. Rep. of Germany . | |
| 7408204 | 6/1974 | Netherlands | 423/241 |
| 226556 | 1/1969 | U.S.S.R. | 423/241 |

*Primary Examiner*—Michael Lewis
*Assistant Examiner*—Brian M. Bolam
*Attorney, Agent, or Firm*—Burns, Doane, Swecker & Mathis

[57] ABSTRACT

A process for the removal of chlorine from off-gases which continuously or sporadically contain small amounts of chlorine by scrubbing the off-gases with a ferrous chloride-containing aqueous solution in a scrubbing system. The solution used is obtained by dissolving a solids mixture which results from the chlorination of a titaniferous and ferriferous feedstock material and which contains essentially ferrous chloride. This solution is used in particular for the scrubbing of off-gases formed in the production of titanium dioxide by the chlorination of titaniferous and ferriferous feedstock material, thus generating titanium tetrachloride and ferrous chloride, and by the reaction of the titanium tetrachloride with oxygen-containing gases. It is preferably the solids mixture separated in this process from the chlorination mixture in a condensation step that is dissolved in the process of the invention, and at least part of the resulting solution is used for the scrubbing of the off-gases. Known devices can be used for scrubbing, e.g., packed columns.

26 Claims, No Drawings

PROCESS FOR THE REMOVAL OF CHLORINE FROM OFF-GASES

BACKGROUND OF THE INVENTION

1. Field of the Invention

The invention relates to a process for the removal of chlorine from off-gases which continuously or sporadically contain small amounts of chlorine, by scrubbing the off-gases with a ferrous chloride-containing aqueous solution in a scrubbing system.

2. Description of the Related Art

Off-gases are formed in many processes, particularly in the production of titanium dioxide by the chlorination of titaniferous and ferriferous feedstock material, thus generating titanium tetrachloride and iron chloride, and by the reaction of the titanium tetrachloride with oxygen-containing gases (chloride process). These off-gases generally contain $CO_2$, $CO$, $N_2$ and often also contain HCl. But these off-gases may further contain small amounts of chlorine either continuously or sporadically. This is frequently the case, for instance, if operating failures are encountered in the chloride process. In the chloride process, this amount of chlorine may, in general, be present in an amount up to two per cent by volume.

For reasons of pollution control, the off-gases must be freed of detrimental constituents before they can be released into the atmosphere. As a rule, this has been done so far by first scrubbing the off-gases with an alkaline solution, for example a sodium hydroxide solution or a sodium carbonate solution and, if necessary, by subsequently subjecting them to an oxidation step to react the carbon monoxide. The alkaline solution absorbs hydrogen chloride and chlorine, if present. The hydrogen chloride is reacted to form sodium chloride and sodium hypochlorite is formed when chlorine is absorbed by the alkaline solution. The resulting dilute hypochlorite solutions cannot be utilized and have to be disposed with the attendant high expenses in disposal cost, equipment and labor.

In the search for other possibilities of removing chlorine from the off-gases, attempts were made to utilize the known reaction of chlorine with a ferrous chloride-containing aqueous solution. A method is known from AT-B-260 643 to remove chlorine from off-gases by scrubbing the off-gas with spent hydrochloric pickling solution containing up to 300 g $FeCl_2$/liter and up to 100 g HCl/liter. This method has the disadvantage of the reaction being rather slow so that an appropriate removal of chlorine from a large volume of off-gas requires a high expense in equipment. In order to accelerate the reaction of chlorine with the ferrous chloride of a ferrous chloride-containing solution, DE-A-25 45 342 proposed to have this reaction take place in the presence of copper ions. Because of its copper ion content the spent solution cannot simply be reutilized. It is therefore regenerated at high cost and directly reused for the scrubbing of off-gas. Also this process requires a great deal of time if utilized on an industrial scale.

SUMMARY OF THE INVENTION

Surprisingly, a specific ferrous chloride-containing aqueous solution by-produced in the chloride process has now been found to have a high efficiency not hitherto known.

The chlorination of titaniferous and ferriferous feedstock material generates not only titanium tetrachloride and small amounts of additional highly volatile metal chlorides but, because of its iron content, also generates a solids mixture which contains metal chlorides in addition to any non-reacted constituents of the feedstock material and potentially the reducing agent. The majority of these metal chlorides is ferrous chloride provided the chlorination reaction is carried in an appropriate way. Other metal chlorides present in minor quantities are ferric chloride and/or chlorides of other metals which are minor components of the feedstock material and may also be derived from the reducing agent, as for example $AlCl_3$, $MnCl_2$, $CrCl_3$, $VOCl_3$, $CaCl_2$, and $MgCl_2$. Furthermore, the solids mixture contains small amounts of titanium tetrachloride.

When this solids mixture is dissolved in water and/or in an aqueous solution, the metal chlorides go into solution. The solution formed is freed from the non-dissolved constituents of the solids mixture—mainly non-reacted feedstock material and reducing agent, if any—and from a small amount of insolubles formed during the dissolving process.

The important aspect of the invention is the use of this solution for the removing of chlorine from off-gases.

DESCRIPTION OF THE PREFERRED EMBODIMENTS

Accordingly a new process has been found for the removal of chlorine from off-gases which continuously or sporadically contain small amounts of chlorine by scrubbing the off-gases with a ferrous chloride-containing aqueous solution in a scrubbing system. The ferrous chloride-containing aqueous solution used to scrub the off-gases is a solution that is obtained by dissolving a solids mixture which results from the chlorination of titaniferous and ferriferous feedstock material and contains ferrous chloride as its essential constituent. The process further comprises separating undissolved components of the solids mixture as well as insolubles formed during the dissolving step from the solution. This solution can generally be used for the scrubbing of off-gases which contain small amounts of chlorine or which involve the risk of containing small amounts of chlorine, e.g., in case of unfavorable operating conditions.

A particular embodiment of the process of this invention comprises using the ferrous chloride-containing aqueous solution for scrubbing off-gases that are formed in the production of titanium dioxide by the chlorination of titaniferous and ferriferous feedstock material, thus generating titanium tetrachloride and ferrous chloride, and by the reaction of the titanium tetrachloride with oxygen-containing gases. This embodiment of the process of this invention concurrently utilizes two waste products of the process.

It is generally favorable in this instance if the process itself provides sufficient ferrous chloride-containing aqueous solution for the scrubbing of the off-gases. It is advantageous in this case that the chlorination uses a titaniferous and ferriferous feedstock material which also contains an amount of iron sufficient for the preparation of the solution required for scrubbing. It has been found to be especially beneficial to use, as the titaniferous and ferriferous feedstock material, slags and/or concentrates that are obtained from titaniferous and ferriferous ores by removing part of the iron content.

Other raw materials known to be suitable for the chlorination may also be used, e.g., natural or synthetic rutile or titaniferous ores such as ilmenite. Also mixtures of various titaniferous and ferriferous feedstock materials are appropriate.

Generally, a reducing agent is used in the chlorination, for example a carbonaceous reducing agent such as anthracite or coke, e.g., petroleum coke. As a general rule, the chlorination is carried out in a fluidized bed, but other methods are also suitable. In a further embodiment of the invention the ferrous chloride-containing aqueous solution and the off-gas are passed countercurrently through the scrubbing system.

Regarding the scrubbing system, it is particularly advantageous to pass the ferrous chloride-containing aqueous solution from top to bottom through a packed column serving as the scrubbing device, and to pass the off-gas from bottom to top through the packed column and contact it with the ferrous chloride-containing aqueous solution in this packed column. The ferrous chloride-containing aqueous solution may be fed and/or withdrawn via at least one holding vessel installed outside the packed column.

An appropriate possibility of implementing the invention is to feed the ferrous chloride-containing aqueous solution batchwise to the scrubbing system, to recycle it in the scrubbing system and to bring it into contact with the off-gases several times, each time with new portions of the off-gases, and then withdraw it batchwise from the scrubbing system. This procedure ensures an optimum utilization of the ferrous chloride-containing aqueous solution in the scrubbing system.

However, the ferrous chloride-containing aqueous solution may also continuously be fed to and withdrawn from the scrubbing system. This method is a particularly simple procedure.

The ferrous chloride-containing aqueous solution withdrawn from the scrubbing system may be treated further or utilized in different ways. A preferred embodiment of the invention for instance is that the ferrous chloride-containing aqueous solution withdrawn from the scrubbing system is utilized for dissolving the solids mixture which results from the chlorination of the titaniferous and ferriferous feedstock material and contains ferrous chloride as its essential constituent. In this way, the solution withdrawn from the scrubbing system is profitably reused within the scope of the titanium dioxide production process.

In the case where the titaniferous and ferriferous raw materials used contain relatively large amounts of iron, larger quantities of the solids mixture are generated which contain essentially ferrous chloride. In this case, it is advisable not to use, for off-gas scrubbing, the entire solution obtained in dissolving this solids mixture. It is then advantageous, according to a special embodiment of the invention, to use, for off-gas scrubbing, only part of the ferrous chloride-containing aqueous solution that is obtained in dissolving the solids mixture which results from the chlorination of the titaniferous and ferriferous feedstock material and contains essentially ferrous chloride, and in separating from it the undissolved constituents of the solids mixture and insolubles formed during the dissolving process. It is further advantageous to unite the solution withdrawn from the scrubbing system with the residual part of the ferrous chloride-containing aqueous solution and to further utilize and/or reprocess the united parts.

The ferrous chloride-containing aqueous solution obtained from the solids mixture may be used directly for off-gas scrubbing. Often, however, a solution with a rather high concentration of ferrous chloride is produced from the solids mixture for reasons of process technology or to make it better utilizable for other purposes. In this instance, the solution then cannot be used directly for off-gas scrubbing. Instead, use is made of a particular embodiment of the process of this invention wherein the ferrous chloride-containing aqueous solution that is obtained by dissolving the solids mixture which results from the chlorination of the titaniferous and ferriferous feedstock material and contains essentially ferrous chloride (is diluted with water and/or a water-based solution) and by separating the undissolved constituents of the solids mixture and insolubles formed during one closing process prior to using it for removing the chlorine from the off-gases.

The ferrous chloride-containing aqueous solution withdrawn from the scrubbing system and optionally that portion of said solution not used for off-gas scrubbing, may further be utilized in different ways, optionally after having been mixed with each other. One field of application for this solutions is, for instance, the cleaning of water or waste water.

Although it is possible to directly scrub the off-gases with the ferrous chloride-containing aqueous solution pursuant to this invention, it may often be more advantageous to pretreat the off-gases prior to scrubbing the off-gases with the ferrous chloride-containing aqueous solution. It is possible in this pretreatment to remove from the off-gas valuable substances or substances undesirable in the off-gas scrubbing according to this invention. Additionally, the pretreatment may suitably condition the off-gases to increase the efficiency of scrubbing and/or ease the scrubbing process.

The off-gases generated in the chloride process originally do not contain water vapor. If the off-gases are subjected directly to the scrubbing with ferrous chloride-containing aqueous solution according to this invention, water from this solution passes over into the off-gases during scrubbing, and the iron content of the solution rises. This may involve the risk of an undesirable precipitation of metal salts and/or an unfavorable composition of the solution or the solution becoming prematurely unusable. As a rule, it is therefore advisable, in these cases to load the off-gases with water vapor in a pre-treatment step. As a rule, it is best to proceed in such a way that the water vapor partial pressure in the off-gases, prior to entering the scrubbing system and during scrubbing, is at least more or less equal to the water vapor partial pressure in the ferrous chloride-containing aqueous solution. This ensures that the condition of the ferrous chloride-containing aqueous solution is not unfavorable changed during scrubbing by the release or take-up of larger amounts of water.

A suitable procedure for the pre-treatment of the off-gases is described for instance in DE-Al 33 28 675.

According to this, a favorable embodiment of the process involves pre-treating the off-gases in the following way prior to scrubbing it with the ferrous chloride-containing aqueous solution:

a) treating the off-gases in a first absorption step with an aqueous solution of titanium oxide chloride whose concentration, calculated as titanium dioxide, is 100–170 g TiO$_2$/liter, and b) subsequently treating the off-gases in a second absorption step with a quantity of water sufficient to absorb the hydrogen chloride and transform it to hydrochloric acid of a concentration of 27–32% by weight HCl.

In this way, volatile chlorine compounds are separated from the off-gas and recovered in the form of industrially usable products. Concurrently the off-gases are loaded with water vapor.

The present invention beneficially permits reprocessing and utilizing waste materials derived from the production of titanium dioxide via titanium tetrachloride, by a certain combination of process steps and without the addition of external substances. Hence, a process has been found also for the production of titanium dioxide via titanium tetrachloride which comprises a combination of the following steps:

a) Chlorination of a titaniferous and ferriferous feedstock material in the presence of a reducing agent, thus generating a metal chlorides-containing reaction mixture, the iron contained in the feedstock material being reacted to form ferrous chloride at least to an essential extent;

b) separation of the less volatile metal chlorides and of other less- or non-volatile substances from the reaction mixture in a first condensation stage, a ferrous chloride-containing solids mixture being obtained;

c) separation of the more volatile metal chlorides consisting essentially of titanium tetrachloride from the reaction mixture in a second condensation step and purification of the titanium tetrachloride, off-gases being formed which occasionally contain small amounts of chlorine;

d) reaction of the purified titanium tetrachloride with an oxygen-containing gas in the vapor phase, with titanium dioxide and chlorine being formed;

e) separation of the titanium dioxide from the chlorine-containing gases;

f) return of the chlorine-containing gases to stage a) optionally after a suitable treatment;

g) dissolution of the solids mixture obtained in step b) in water and/or a water-based solution, with a ferrous chloride-containing aqueous solution being formed;

h) separation, from the ferrous chloride-containing aqueous solution, of the components of the solids mixture not dissolved in step g) and of insolubles formed during the dissolving process;

i) utilization of at least part of the ferrous chloride-containing aqueous solution, optionally after dilution with water and/or water-based solution, for the scrubbing of the off-gases resulting from step c) optionally after the off-gases have been pretreated;

j) return of the solution used in step i) back to step g).

In case chlorine is contained in the off-gas, the amount of chlorine, as a rule, is up to 2% by volume.

The ferrous chloride-containing aqueous solution should have a composition such that its HCl partial pressure under the operating conditions does not exceed the legally permissible level as otherwise hydrogen chloride removal from the off-gases would be insufficient and additional steps would have to be taken for hydrogen chloride removal. The HCl partial pressure in the solution is dependent on the operating temperature and on the chloride ion content in the solution and can readily be determined. In general, the solution prior to being used for off-gas scrubbing should contain no more than 5% by weight divalent iron and no more than 7% by weight HCl.

On contact of the ferrous chloride-containing aqueous solution with the off-gas, the chlorine is taken up by the solution while trivalent iron is being formed. Concurrently, the chloride ion content of the solution increases. In addition, the HCl content of the solution is increased by the take-up of the hydrogen chloride from the off-gases which results in an additional increase in the chloride ion content of the solution.

There are several factors which determine the speed of chlorine take-up by the solution and hence the efficiency of the process of this invention. The speed is, for example, dependent on the temperature of the off-gases and of the solution. The process can often be conducted at room temperature. A moderate increase in temperature can increase the speed of chlorine take-up. Generally, however, a temperature of 44° C. should not be exceeded as otherwise the HCl partial pressures would rise which, in turn, would result in a reduction of the gas take-up by the solution. In general, a temperature between 30° and 40° C. is best suited for industrial operation.

Another factor influencing the process of this invention is the hydrogen chloride content of the solution. The speed of chlorine take-up by the solution rises with the hydrogen chloride content of the latter. Owing to the simultaneous absorption of hydrogen chloride, the HCl content of the solution increases during the scrubbing process. Initially this rise in hydrogen chloride concentration of the solution favors its ability to take up chlorine, but the hydrogen chloride content of the solution must not exceed a certain level since the HCl partial pressure of the solution goes up concurrently and may attain a level beyond the legally permissible limit. In industrial applications, one will generally take care not to exceed a hydrogen chloride content of the solution of 7 by weight.

A further factor affecting the speed of chlorine take-up is the content of divalent iron in the solution. The higher the divalent iron content, the more effective is the solution. However, an upper limit has to be observed here, as well, since a rising divalent iron content in the scrubbing solution and hence a rising chloride ion content of the solution will raise its HCl partial pressure. It has been found to be generally useful to use a solution in the process of this invention which has a divalent iron content between 3 and 5% by weight.

While the solution is in contact with the off-gases, divalent iron is oxidized to trivalent iron through the chlorine taken up. As a result, the solution grows poor in divalent iron and decreases in efficiency. In order to prevent chlorine from passing through, it is generally advisable to utilize the solution only until at most half of its iron is present in trivalent form. The ferrous chloride-containing aqueous solution can be recycled in the scrubbing system until this state is reached.

However, one may also proceed such as to pass the ferrous chloride-containing aqueous solution only once through the scrubbing system and then withdraw it.

Further factors having an influence on the process of this invention are the distribution of liquid and gas, the size of the scrubbing device and the surface made available to the liquid in relation to the volume of gas scrubbed. These factors have a decisive effect on the time of contact between solution and off-gas.

All factors mentioned have to be suitably adjusted to each other in each individual case. The optimum values for the various factors can readily be determined by trials when taking into account the above-stated relations.

The desired composition of the ferrous chloride-containing aqueous solution can be adjusted by suitable additions before or during the dissolution of the solids mixture and/or by additions to the solution which results from the dissolving process. In the same way it is possible to favorably influence the dissolving process proper by such additions. It is often useful, for instance, to add a small amount of hydrochloric acid to improve the filterability of the solution.

The components of the solids mixture not dissolved in the formation of the ferrous chloride-containing aqueous solution and separated from the solution, which components essentially consist of unreacted constituents of the titaniferous and ferriferous feedstock material and potentially of the reducing agent, can at least partially be returned, after a suitable treatment, to the chlorination stage for the production of titanium tetrachloride.

An efficient and sufficient elimination of chlorine from the off-gas can be achieved by the process of the invention after contact times of much less than one minute, occasionally only a few seconds.

All known devices can be used for scrubbing which provide a large surface area for contacting the off-gases and solution. Suitable devices are, for instance, packed columns into which the off-gases are introduced from the bottom and onto which the ferrous chloride-containing aqueous solution is passed from top, via a liquid distributor, such as to contact solution and off-gases countercurrently. In this instance it is advisable, as a rule, to provide a device for heating the solution prior to introducing it into the packed column and/or to surround the packed column on its outside with a heating device in order to ensure that the operating temperature does not drop below the requested value.

The invention relates to a process for the removal of chlorine from off-gases which continuously or sporadically contain small amounts of chlorine, through scrubbing them with a ferrous chloride-containing aqueous solution in a scrubbing system. The solution used is obtained in dissolving a solids mixture which results from the chlorination of a titaniferous and ferriferous feedstock material and essentially contains ferrous chloride. This solution is used in particular for the scrubbing of off-gases formed in the production of titanium dioxide by the chlorination of titaniferous and ferriferous feedstock material, thus generating titanium tetrachloride and ferrous chloride, and by the reaction of the titanium tetrachloride with oxygen-containing gases. It is preferably the solids mixture separated in this process from the chlorination mixture in a condensation step that is dissolved in the process of the invention, and at least part of the resulting solution is used for the scrubbing of the off-gases. Known devices can be used for scrubbing, e.g., packed columns.

The following examples will more fully illustrate the invention.

EXAMPLE 1

The device for the off-gas scrubbing was a scrubbing column having an inner diameter of 2.5 cm, filled over a height of 30 cm with Raschig rings of 6 mm diameter. The ferrous chloride-containing aqueous solution was introduced at the head of the column via a liquid distributor. The gases to be scrubbed were introduced into the lower part of the scrubbing column and withdrawn after scrubbing at its top.

In a first condensation step a solids mixture was obtained from a reaction mixture formed in the chlorination of a titaniferous slag, in separating the less volatile metal chlorides and other less- or non-volatile substances (unreacted constituents of feedstock material and reducing agent); said solids mixture was dissolved in water. After separation of the undissolved constituents of the solids mixture and of small amount of insolubles formed during the dissolving process, a solution was obtained which showed the following composition (in % by weight):

| | |
|---|---|
| $FeCl_2$ | 10.00% |
| $AlCl_3$ | 2.52% |
| $TiOCl_2$ | 0.53% |
| $MnCl_2$ | 1.82 |
| $VOCl_2$ | 0.33% |
| $CrCl_3$ | 0.18% |
| $NbCl_5$ | 0.15% |
| $ZrCl_4$ | 0.27% |
| HCl | 1.01% |

This solution is denoted "solution A".

For comparison a solution was used prepared by dissolving technically pure ferrous chloride tetrahydrate (98.5% $FeCl_2.4H_2O$) in water. This solution contained 10.0 wt. % $FeCl_2$ and 1 wt. % HCl.

This solution is denoted "solution B".

The efficiency of each solution was determined by way of the amount of chlorine present in the treated gases after leaving the scrubber. To this end, the gases were passed through a wash bottle downstream of the scrubber, which bottle was filled with a 15% NaOH solution.

Chlorine not taken up by the ferrous chloride-containing solution in the scrubber was absorbed by the NaOH solution and determined by means of the chloride ion content in this solution.

The model off-gases were a stream-saturated gas mixture of 400 liter/h $N_2$ and 8 liter/h $Cl_2$, corresponding to a chlorine content of 1.88% by volume and having a temperature of 30° C. This mixture was introduced through the bottom of the scrubbing column. 5 liter/h of scrubbing solution A were introduced from the top onto the scrubbing column. Solution A had likewise a temperature of 30° C. Contact time between gas and liquid was 1.25 seconds.

No chlorine was found in the wash bottle. Hence, the chlorine had been quantitatively removed from the off-gases in the scrubbing column.

EXAMPLE 1A (FOR COMPARISON)

The same procedure was followed as in Example 1 with the only difference of solution B being used instead of solution A. In this example, a chlorine content of 0.58 by volume was found in the scrubbed gas after having left the scrubber. That means that only 69.1 % of the chlorine in the gas mixture had been scrubbed out.

Example 1 shows that in using the ferrous chloride-containing aqueous solution of the present invention, the chlorine could be removed quantitatively from the gas mixture containing roughly 2% by volume chlorine, in less than 2 seconds contact time between liquid and gas mixture. The technically pure ferrous chloride-containing solution on the other hand did not remove adequate quantities of chlorine from the gas mixture under the same conditions. This proved that the ferrous chloride-containing aqueous solution of the present invention surprisingly is extremely efficient.

EXAMPLE 2

In a plant for the production of titanium tetra chloride by the chlorination of titaniferous and ferriferous raw material, 3900 m³/h of off-gases were obtained (gas in standardized state) after separation of the titanium tetrachloride, which off-gases had the following composition: 49.0% by volume CO, 35.0% by volume $CO_2$ and 16% by volume $N_2$. In a pretreatment the off-gases were saturated with water vapor by:

a) treating the off-gases in a first absorption step with an aqueous solution of titanium oxide chloride having a concentration, calculated as titanium dioxide, of 100–170 g $TiO_2$/liter; and b) subsequently treating the off-gases in a second absorption step with a quantity of water sufficient to absorb the hydrogen chloride and to transform it to hydrochloric acid having a concentration of 27–32% by weight HCl.

The scrubbing system used for scrubbing the pretreated off-gas consisted of a scrubbing column serving as the scrubbing device and having an inner diameter of 1.98 m packed with Raschig rings (50×50 mm) over a height of 5 m, of a holding tank, pipelines which connected the holding tank with the upper and the lower end of the scrubbing column, and of pipelines for passing the off-gases and the scrubbing liquid into the scrubbing system and for withdrawing the cleaned off-gases and used scrubbing liquid from the scrubbing system.

22 m³ of solution A were filled into the holding tank. At a rate of 43 m³/h and a temperature of 30° C., this solution was introduced, via a liquid distributor, into the upper end of the scrubbing column, withdrawn at the lower end of the column and recycled via the holding tank and the scrubbing column. The off-gases at a temperature of 35° C. were introduced into the lower end of the column and withdrawn from the scrubbing system at the upper end of the column. The contact time between off-gases and scrubbing liquid was 11.9 seconds.

The chlorination process was run continuously. In the course of three weeks there was a process disturbance three times with chlorine leakages so that chlorine got into the off-gases, viz. once 0.5% by volume for 45 minutes, once 1.2% by volume for 30 minutes and once 1.8% by volume for 50 minutes. In all these chlorine leakages, the chlorine was entirely taken up by the recycling ferrous chloride-containing aqueous solution.

In order to further document the efficiency of this solution, two further failures were subsequently simulated without renewing the scrubbing liquid. For simulation chlorine was added to the off-gases prior to its entering the scrubbing system, viz. once 0.2% by volume for 180 minutes and once 2.0% by volume for 60 minutes. Also in these cases the chlorine was fully taken up by the recycling ferrous chloride-containing aqueous solution.

After these experiments the ferrous chloride-containing aqueous solution contained 4.3% by weight $FeCl_2$ and 5.5% by weight $FeCl_3$. The solution was withdrawn from the scrubbing system and used, besides water, for dissolving a new batch of ferrous chloride-containing solids mixture obtained in the chlorination of titaniferous and ferriferous raw materials.

Again 22 m³ of solution A were filled into the holding tank and recycled between scrubbing column and holding tank, and off-gas scrubbing was continued as described above.

The same results were obtained when the ferrous chloride-containing aqueous solution was continuously, instead of batchwise, introduced into and withdrawn from, the scrubbing system.

What is claimed is:

1. A process for the removal of chlorine from off-gases which continuously or sporadically contain chlorine comprising scrubbing the off-gases with a ferrous chloride-containing aqueous solution in a scrubbing system, said ferrous chloride-containing aqueous solution being obtained by dissolving a solids mixture resulting from chlorination of a titaniferous and ferriferous feedstock material and containing essentially ferrous chloride and by separating from the solution the undissolved components of the solids mixture and insoluble substances formed during the dissolution step.

2. The process of claim 1 wherein the off-gases are formed in the production of titanium dioxide by chlorinating the titaniferous and ferriferous feedstock material thus generating titanium tetrachloride and ferrous chloride, and reacting the titanium tetrachloride with oxygen-containing gases.

3. The process of claim 2 wherein the titaniferous and ferriferous feedstock material is slag and/or concentrate obtained from titaniferous and ferriferous ore by removing part of the iron content.

4. The process of claim 3 wherein the ferrous chloride-containing aqueous solution and the off-gases are passed countercurrently through the scrubbing system.

5. The process of claim 4 wherein the scrubbing system comprises a packed column and the ferrous chloride-containing aqueous solution is passed from the top of the packed column and withdrawn at its lower end, and wherein the off-gases are passed from the bottom to the top through the packed column and is contacted with the ferrous chloride-containing aqueous solution in the packed column.

6. The process of claim 5 wherein at least one of the ferrous chloride-containing aqueous solution being fed and the ferrous chloride-containing aqueous solution being withdrawn from the packed column is passed through at least one holding tank installed outside the packed column.

7. The process of claim 5 wherein the ferrous chloride-containing aqueous solution is fed batchwise to the scrubbing system, recycled in said scrubbing system and contacted with several new portions of the off-gases and then withdrawn batchwise from the scrubbing system.

8. The process of claim 5 wherein the ferrous chloride-containing aqueous solution is continuously fed to and withdrawn from the scrubbing system.

9. The process of claim 5 wherein the ferrous chloride-containing aqueous solution withdrawn from the scrubbing system is utilized for dissolving the solids mixture which results from the chlorination of the titaniferous feedstock material and which contains essentially ferrous chloride.

10. The process of claim 9 wherein only part of the ferrous chloride-containing aqueous solution that is obtained by dissolving the solids mixture which results from the chlorination of the titaniferous and ferriferous feedstock material and which contains essentially chloride and by separating the undissolved constituents of the solids mixture and insolubles formed during the dissolving process, is used for scrubbing the off-gases and wherein the solution withdrawn from the scrubbing system is combined with the residual part of the ferrous chloride-containing aqueous solution and the combined parts are further utilized and/or reprocessed.

11. The process of claim 10 wherein the ferrous chloride-containing aqueous solution that is obtained by dissolving the solids mixture which results from the chlorination of the titaniferous and ferriferous feedstock material and which contains essentially ferrous chloride and by separating the undissolved constituents of the solids mixture and insolubles formed during the dissolving process, is diluted with water and/or a water-based solution prior to using the solution for removing the chlorine from the off-gases.

12. The process of claim 11 wherein the off-gases are pretreated prior to scrubbing the off-gases with the ferrous chloride-containing aqueous solution.

13. The process of claim 11 wherein the pre-treatment of the off-gases comprises:
   a) treating the off-gases in a first absorption step with an aqueous solution of titanium oxide chloride having a concentration, calculated as titanium dioxide, of 100–170 g $TiO_2$/liter; and
   b) subsequently treating the off-gases in a second absorption step with a quantity of water sufficient to absorb the hydrogen chloride and to transform it to hydrochloric acid having a concentration of 27–32% by weight HCl.

14. The process of claim 1 wherein the ferrous chloride-containing aqueous solution and the off-gases are passed countercurrently through the scrubbing system.

15. The process of claim 14 wherein the scrubbing system is a packed column and the ferrous chloride-containing aqueous solution is passed from the top of the packed column and withdrawn at its lower end, and wherein the off-gases are passed from the bottom to the top through the packed column and is contacted with the ferrous chloride-containing aqueous solution in the packed column.

16. The process of claim 15 wherein at least one of the ferrous chloride-containing aqueous solution being fed and withdrawn from the packed column is passed through at least one holding tank installed outside the packed column.

17. The process of claim 1 wherein the ferrous chloride-containing aqueous solution is fed batchwise to the scrubbing system, recycled in said scrubbing system and contacted with several new portions of the off-gases and then withdrawn batchwise from the scrubbing system.

18. The process of claim 1 wherein the ferrous chloride-containing aqueous solution is continuously fed to and withdrawn from the scrubbing system.

19. The process of claim 1 wherein the ferrous chloride-containing aqueous solution withdrawn from the scrubbing system is utilized for dissolving the solids mixture which results from the chlorination of the titaniferous and ferriferous feedstock material and which contains essentially ferrous chloride.

20. The process of claim 1 wherein only part of the ferrous chloride-containing aqueous solution that is obtained by dissolving the solids mixture which results from the chlorination of the titaniferous and ferriferous feedstock material and which contains essentially ferrous chloride and by separating the undissolved constituents of the solids mixture and insolubles formed during the dissolving process, is used for scrubbing the off-gases and wherein the solution withdrawn from the scrubbing system is combined with the residual part of the ferrous chloride-containing aqueous solution and the combined parts are further utilized and/or reprocessed.

21. The process of claim 1 wherein the ferrous chloride-containing aqueous solution that is obtained by dissolving the solids mixture which results from the chlorination of the titaniferous and ferriferous feedstock material and which contains essentially ferrous chloride and by separating the undissolved constituents of the solids mixture and insolubles formed during the dissolving process, is diluted with water and/or a water-based solution prior to using the solution for removing the chlorine from the off-gases.

22. The process of claim 21 wherein the off-gases are pretreated prior to scrubbing the off-gases with the ferrous chloride-containing aqueous solution.

23. A process for the production of titanium dioxide comprising:
   a) chlorinating a titaniferous and ferriferous feedstock material in the presence of a reducing agent, thereby generating a metal chlorides-containing reaction mixture, the iron contained in the feedstock material being at least to an essential part reached to form ferrous chloride;
   b) separating the less volatile metal chlorides and other less or non-volatile substances from the reaction mixture in a first condensation step thereby obtaining a ferrous chloride-containing solids mixture;
   c) separating the more volatile metal chlorides consisting essentially of titanium tetrachloride from the reaction mixture in a second condensation step and purifying the titanium tetrachloride thereby forming off-gases which at least occasionally contain of chlorine;
   d) reacting the purified titanium tetrachloride with an oxygen-containing gas in the vapor phase thereby forming titanium dioxide and chlorine-containing gases;
   e) separating the titanium dioxide from the chlorine-containing gases;
   f) returning the chlorine-containing gases to step a);
   g) dissolving the solids mixture obtained in step b) in water and/or a water based solution thereby forming a ferrous chloride-containing aqueous solution;
   h) separating the components of the solids mixture not dissolved in step g) and insolubles formed during the dissolving process from the ferrous chloride-containing aqueous solution;
   i) using at least part of the ferrous chloride-containing aqueous solution for the scrubbing of the off-gases resulting from step c); and
   j) returning the solution used in step i) back to step g).

24. The process of claim 23 wherein the chlorine-containing gases of step f) is treated prior to being returned to step a).

25. The process of claim 23 wherein said at least part of the ferrous-chloride-containing aqueous solution of step i) is diluted with water and/or a water-based solution prior to being used for scrubbing off-gases.

26. The process of claim 23 wherein the off-gases are pretreated prior to being scrubbed.

* * * * *

UNITED STATES PATENT AND TRADEMARK OFFICE
CERTIFICATE OF CORRECTION

PATENT NO. : 5,073,355
DATED : December 17, 1991
INVENTOR(S) : Hartmann

It is certified that error appears in the above-identified patent and that said Letters Patent is hereby corrected as shown below:

In column 10, line 59, before "feedstock" insert --and ferriferous--.

In column 10, line 65, after "essentially" insert --ferrous--.

In column 12, line 37, after "contain" insert --small amounts of--.

Signed and Sealed this

Thirty-first Day of May, 1994

Attest:

BRUCE LEHMAN

Attesting Officer

Commissioner of Patents and Trademarks